United States Patent [19]

Patel et al.

[11] Patent Number: 4,933,788
[45] Date of Patent: Jun. 12, 1990

[54] TAPE RECORDING AND/OR REPRODUCING APPARATUS

[75] Inventors: Bhupendrabhai F. Patel; Howard A. Feinberg; George Tsai; Shih-Ming Yang, all of Santa Clara County; Richard A. Wilkinson, Jr., Santa Cruz County; Enoch Mylabathula, Santa Clara County, all of Calif.

[73] Assignee: Seagate Technology, Inc., Scotts Valley, Calif.

[21] Appl. No.: 271,114

[22] Filed: Nov. 14, 1988

[51] Int. Cl.$^5$ ............................................. G11B 5/027
[52] U.S. Cl. ........................................ 360/85; 360/95; 360/96.5
[58] Field of Search ........................... 360/85, 84, 95

[56] References Cited

U.S. PATENT DOCUMENTS 4,580,183 4/1986 Maeda et al. ................... 360/94
4,752,844 6/1988 Suzuki ................................ 360/85
4,775,904 10/1988 Kimura et al. ................... 360/85
4,789,912 12/1988 Masuda et al. ................... 360/85

Primary Examiner—John H. Wolff
Attorney, Agent, or Firm—Flehr, Hohbach, Test, Albritton & Herbert

[57] ABSTRACT

A tape withdrawal and positioning system is provided for withdrawing tape from its initial position within a tape cassette and positioning it in proximity to or in contact with a tape recording and/or reproducing apparatus. The tape withdrawal and positioning system comprises a pair of lever arms having tape guide posts adjustable between an initial position wherein the tape guide posts are positioned behind an access portion of the tape within the tape cassette and an operating position whereon the lever arms are extended and the tape guide posts are positioned in proximity to the recording and/or reproducing apparatus. In the operating position, and tape is in contact with a portion of the recording and/or reproducing apparatus.

16 Claims, 9 Drawing Sheets

FIG.—4

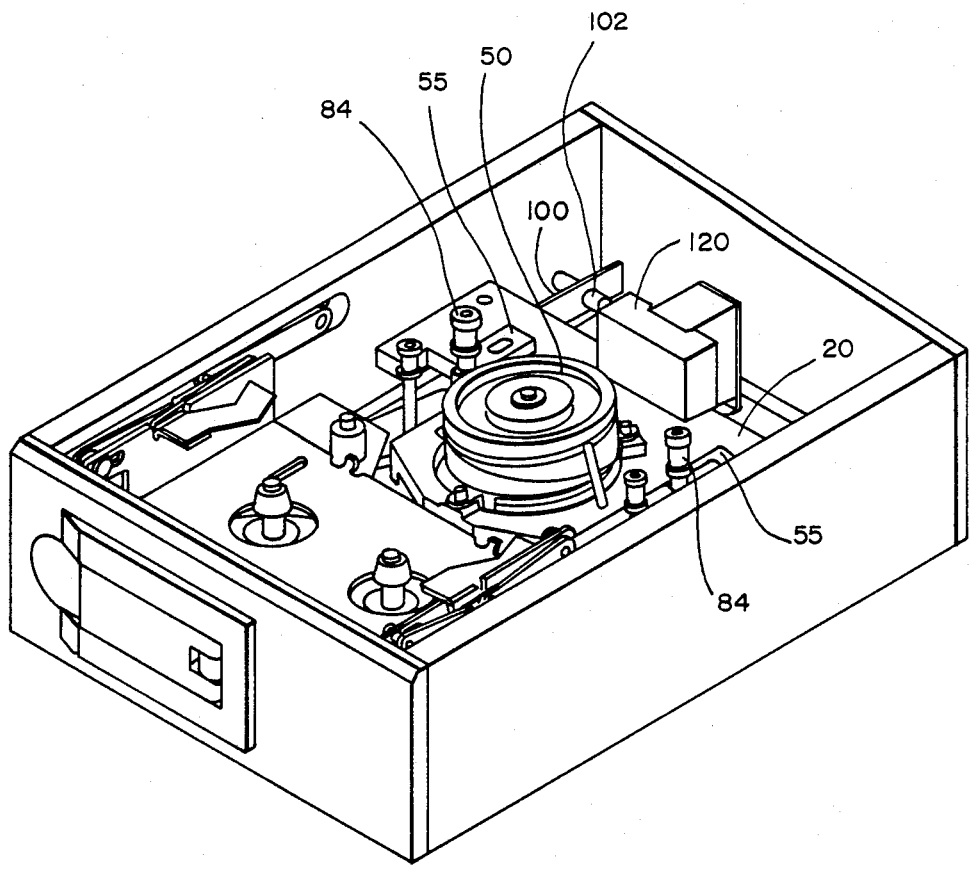
FIG.—8

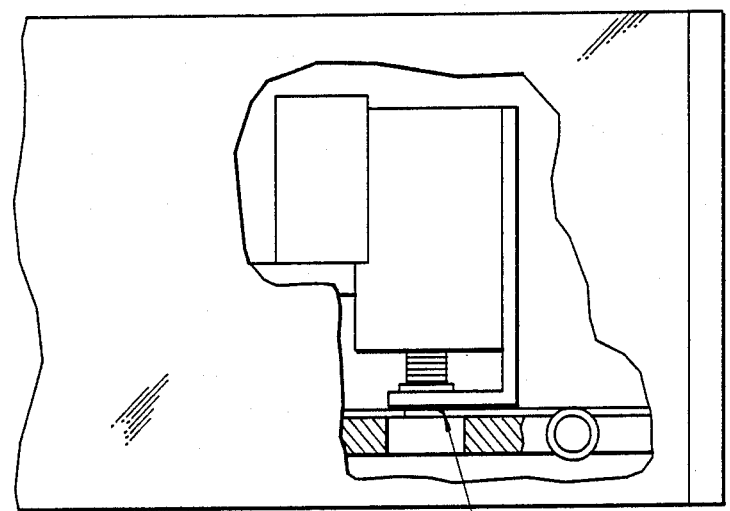
FIG.—9A  SOLENOID LATCH OPEN
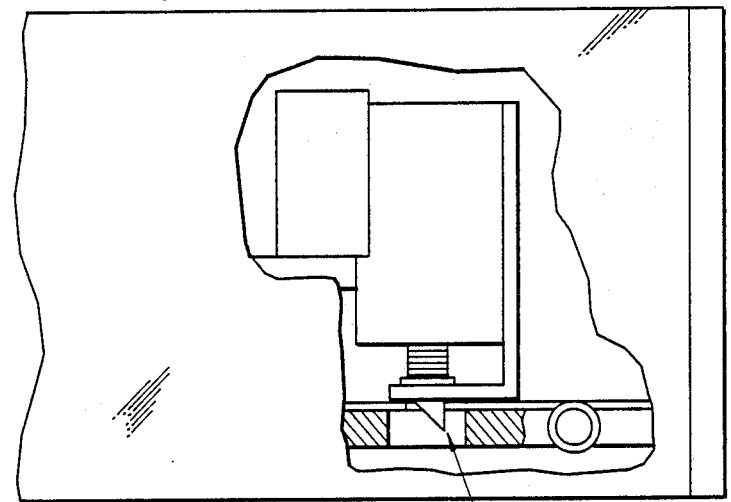
FIG.—9B  SOLENOID LATCH CLOSED

TAPE RECORDING AND/OR REPRODUCING APPARATUS

CROSS REFERENCE TO RELATED APPLICATIONS

The following applications are incorporated by reference as containing detailed disclosures of elements of the system described below:
1. TAPE WITHDRAWAL AND POSITIONING SYSTEM by Richard Adolph Wilkinson, Jr., Howard Alan Feinberg, and Bhupendrabhai F. Patel, U.S. Ser. No. 271,115;
2. TAPE GUIDANCE ARRANGEMENT by Howard Alan Feinberg and Shih-Ming Yang, U.S. Ser. No. 270,239; and
3. CASSETTE LOADER AND EJECTION ASSEMBLY FOR TAPE RECORDING AND/OR REPRODUCING APPARATUS by Howard Alan Feinberg and George Tsai, U.S. Ser. No. 270,752

These applications are filed simultaneously herewith on Nov. 14, 1988.

TECHNICAL FIELD

The present invention relates generally to a tape recording and/or reproducing apparatus having a manual cassette loading and ejection system including a base plate assembly cassette carriage for mounting a tape cassette, positioning the tape in proximity to or in contact with a tape recording and/or reproducing apparatus in an operating position, and housing and securement means for enclosing the components and preventing accidental movement of or tampering with the components during operation. The present invention relates, more specifically, to an integrated tape recording and/or reproducing apparatus which is particularly suitable for use with digital audio tape (DAT) formats

BACKGROUND ART

Numerous devices utilize magnetic tape having various formats for recording and/or reproducing video and audio material A length of magnetic tape is typically wound on tape supply and take-up reels and enclosed in a protective cassette An access portion of tape extends between the supply and take-up reels and is generally threaded around suitable guides to provide a consistently aligned tape access portion in proximity to one peripheral edge of the cassette. Various types of video and audio tape cassettes having various standardized cassette configurations are known in the art.

Some types of tape recording and/or reproducing apparatus are arranged so that the tape remains within the cassette during operation, and the recording head, the reproducing head, the erasing head, and the like are moved into contact with the tape access portion as the tape is wound from one reel and transferred to the other within the cassette. With other types of tape formats, the access portion of the tape must be withdrawn from its initial position within the cassette and positioned at a stationary recording or reproducing apparatus. The digital audio tape (DAT) format may be classified in this second category of tape formats, wherein an access portion of the tape is withdrawn from the cassette and positioned in contact with the recording or reproducing drum during operation. The tape is returned to its initial position within the cassette after the recording or reproducing operation is complete.

Standardized design and dimensional parameters of DAT cassette arrangements are well known in the art. The reels are driven by rotatable drive shafts mounted in a cassette carriage forming part of a recording and/or reproducing apparatus, and a tape reel locking mechanism is generally provided for preventing rotation of the reels to maintain the access portion of the tape in a moderately taut condition extending along the front face of the cassette when the cassette is not in operation. In addition, a rotatable lid member is mounted at an inner peripheral side of the cassette to protect the access portion of the tape when it is not being used and to provide access to the tape in the operating position.

Means for recording information on tape and for reproducing audio material pre-recorded on tape are well known in the art. Helical recording drums are typically employed. Like other types of magnetic tape apparatus, insertion of a tape cassette into a cassette carriage typically aligns and anchors the cassette by insertion of datum pins mounted on the cassette carriage or a base plate into datum pin apertures provided in the cassette. In addition, during insertion of the DAT cassette into a cassette carriage, the rotatable lid member of the cassette is pivoted to provide access to the tape, and the access portion of the DAT is positioned in a tape withdrawal and positioning condition. In this position, tape guide posts are typically positioned within the cassette behind the access portion of the DAT, and subsequent movement of the tape guide posts withdraws the tape from within the cassette and positions it in proximity to or in contact with the recording or reproducing apparatus.

Many different types of tape cassette loading and ejection systems are used in connection with tape recording and/or reproducing assemblies. In many cases, lateral displacement of the cassette carriage is effected to position the tape in proximity to the tape recording and/or reproducing apparatus. Many prior art cassette loading and ejection systems utilize motorized drive means to achieve displacement of the cassette carriage.

Prior art tape withdrawal positioning means for use with DAT apparatus typically comprise posts with tape guide rollers mounted thereon which are movable in slots provided in a base plate or the like. The access portion of the tape is positioned in proximity to and in front of the tape guide rollers when the tape cassette is mounted in the cassette carriage. Movement of the posts along their predetermined slot paths withdraws the access portion of the tape from within the cassette and positions it in proximity to or in contact with the recording drum or reproducing apparatus. The tape guide posts are typically operated by a motorized drive means for movement of the posts along their slot paths. Another conventional tape withdrawal and positioning system utilizes an arrangement wire drive arrangement operatively engaged with motorized drive means for manipulating the tape guide supports to withdraw the access portion of the tape from the cassette, and to return the tape to its initial position within the cassette.

Use of motorized drive means for the cassette loading and ejection systems and the tape withdrawal and positioning function contributes substantially to the expense and complexity of the tape recording and/or reproducing apparatus, and may impose substantial energy requirements. In addition, the use of motorized drive means for operation of the cassette loading and ejection system and the tape withdrawal and positioning system substantially reduces the reliability of the tape recording and/or reproducing apparatus.

Accordingly, it is an objective of the present invention to provide a tape recording and/or reproducing apparatus which is manually operable and does not require motorized drive means.

It is another objective of the present invention to provide a tape recording and/or reproducing apparatus which is comparatively less expensive to manufacture, assemble and operate than conventional motorized tape recording and/or reproducing assemblies.

It is yet another objective of the present invention to provide a tape recording and/or reproducing apparatus which provides consistent, reliable operation over the course of long-term usage.

It is still another objective of the present invention to provide a tape recording and/or reproducing apparatus which incorporates mechanical and/or electromechanical latching features to prevent damage to the tape from occurring as a result of improper loading or premature ejection of the tape from the apparatus.

DISCLOSURE OF THE INVENTION

The tape recording and/or reproducing apparatus of the present invention includes a tape carriage for receiving a tape cassette and mounting it in an initial position wherein an access portion of the tape is positioned for withdrawal from the cassette. The tape carriage is movable between an upper tape insertion position and a lower initial tape access position. The tape carriage is preferably slidable in housing members toward the tape recording and/or reproducing apparatus for the tape recording and/or reproducing operations, and away from the tape recording and/or reproducing apparatus for tape cassette loading and mounting.

The tape withdrawal and positioning system of the present invention utilizes pivotal lever arms having tape guide posts mounted thereon for contacting, withdrawing and positioning the tape. The pivotal lever arms are movable between an initial position wherein the tape guide posts are disposed adjacent and behind the access portion of the tape in an interior portion of the cassette, and an operating position wherein the tape guide posts are in proximity to a tape recording and/or reproducing drum to position the tape in proximity to or in contact with the drum. The lever arms carrying the tape guide posts are pivoted between the initial and operating positions by interaction of the lever arms with a lever arm guide means during lateral displacement of the cassette carriage.

The tape carriage forming part of the tape recording and/or reproducing apparatus of the present invention preferably includes means for preventing the tape carriage from sliding engagement with the housing when the tape cassette is not in the fully mounted, initial tape access position. Latch means is also provided in conjunction with the tape carriage to positively latch the cassette carriage in the initial, tape access position, and to release the cassette from the tape access position to permit withdrawal of the tape cassette from the carriage apparatus when a recording or reproduction function has been completed.

The tape recording and/or reproducing apparatus of the present invention preferably includes an electromechanical latching device to prevent lateral displacement of the tape cassette and cassette carriage before a recording or reproducing function has been completed. The electro-mechanical device preferably comprises a solenoid activated latching device mounted to positively latch the base plate upon which the cassette carriage is mounted in the operating position to maintain the cassette carriage and the tape cassette in the operating position and prevent accidental or premature displacement or removal of the tape cassette before the recording or reproducing function has been completed.

BRIEF DESCRIPTION OF THE DRAWINGS

The above-mentioned and additional features of the present invention and the manner of obtaining them will become apparent, and the invention will be best understood by reference to the following more detailed description read in conjunction with the accompanying drawings, in which:

FIG. 8 shows an upper frontal perspective view of the tape recording and/or reproducing apparatus of the present invention in the final operating position without a tape cassette and showing the electromechanical latching means FIG. 9A shows a partially cross-sectional view of the electromechanical latching means of FIG. 8 in an open latch condition; and FIG. 9B shows a partially cross-sectional view of the electromechanical latching means of FIG. 8 in a closed latch condition.

BEST MODE OF CARRYING OUT THE INVENTION

The tape recording and/or reproducing apparatus of the present invention is suitable for use with tape recording and/or reproducing apparatus wherein a tape cassette is inserted and securely mounted in a cassette carriage, and the cassette carriage is laterally displaced with respect to the tape recording and/or reproducing apparatus to effect withdrawal of the tape from the cassette and positioning of the tape in proximity to or in contact with the recording drum or reproducing apparatus.

The tape recording and/or reproducing apparatus is particularly suitable for use with digital audio tape (DAT) cassettes and DAT recording and/or reproducing apparatus, but it is not limited to this application and features hereof may be useful with many types of cassette record/playback devices.

Figure 1:
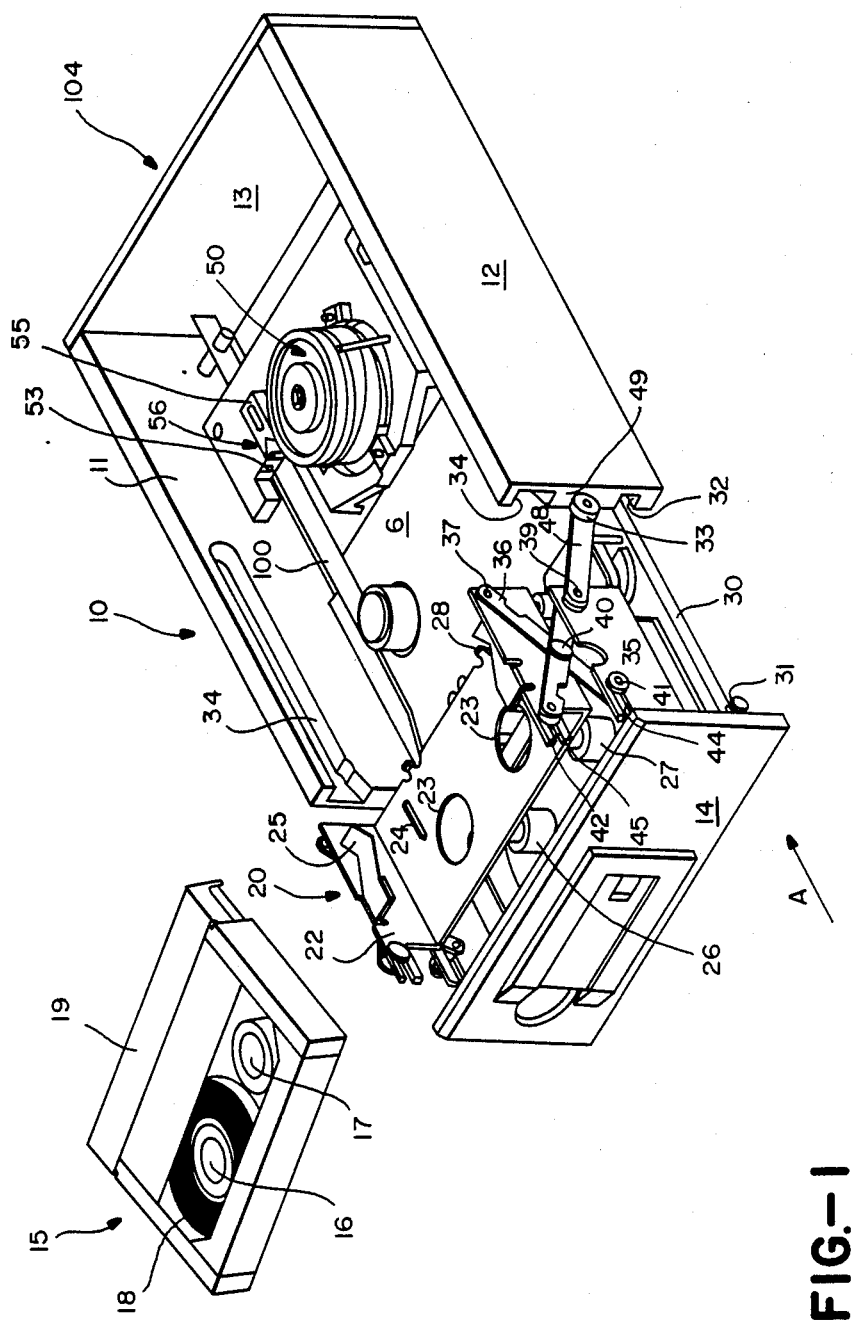
FIG. 1 shows an upper perspective view of the tape recording and/or reproducing apparatus of the present invention in a tape cassette mounting position.

FIG. 1 shows a frontal perspective view of tape recording and/or reproducing apparatus 10, including cassette carriage 20 and recording and/or reproducing transducer 50 enclosable in a generally rectangular housing. The housing is generally provided by housing sidewalls 11 and 12 joined by rear housing end wall 13. Front housing end wall 14 and cassette carriage 20 are mounted on base plate 6, which is slidable with relation to tape recording and/or reproducing transducer 50.

As mentioned previously, tape cassettes in general and DAT cassettes in particular conform to standardized parameters regarding design, dimensions, placement of recognition and positioning holes, and the like. Tape cassette 15 comprises tape supply and take-up reels 16 and 17, respectively, rotatably arranged side by side in cassette 15. Magnetic tape 18 is anchored to and wound on supply and take-up reels 16 and 17, and an access portion 18' of the tape extends therebetween and is positioned by means of tape guides provided in the interior of the cassette. Access portion 18' of the tape extends along substantially the length of the inner peripheral wall of cassette 15. The cassette includes a slidable bottom cover which covers access to the tape reels 16, 17 except when the tape is in use and a hinged front cover 19 which must be opened to withdraw the access portion of the tape. The present invention includes means for opening both the sliding reel cover and the hinged tape access cover. With some modification, this cassette loading and accessing mechanism could be used with other types of cassettes.

FIG. 1 illustrates cassette carriage 20 of the present invention in an upper, cassette insertion position. Cassette carriage 20 comprises a cassette tray including base member 21 having upstanding sidewalls 22. Base member 21 has spaced apertures 23 permitting passage of tape supply reel shaft 26 and tape take-up reel shaft 27. Upstanding projections 24 are mounted on the upper surface of base member 21 for unlatching the slidable cover over the reels of tape cassette 15 to allow the cover to be moved to an open position during insertion of the cassette into cassette carriage 20. Retaining clips 25 are provided in proximity to upstanding sidewalls 22 to snugly retain the tape cassette in the cassette carriage assembly. Stop means 28 in the form of projections at the inner peripheral edge of cassette carriage base member 21 are preferably provided to limit insertion of the tape cassette 15 into the cassette carriage tray to properly align the supply and take-up reels with the corresponding supply and take-up drive shafts and to open the cover on the bottom of the cassette.

Figure 7:
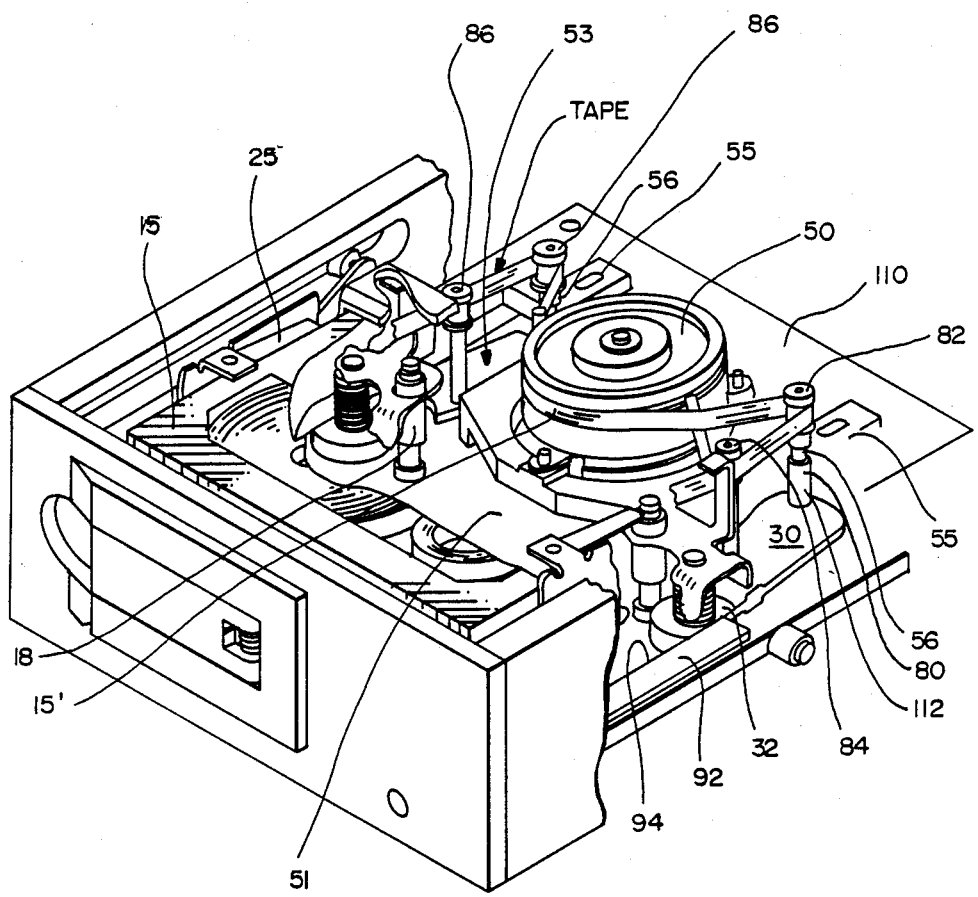
FIG. 7 shows an upper frontal perspective view of a tape cassette mounted in a cassette carriage slidably engaged in a tape recording and/or reproducing apparatus housing, with the tape and the tape guidance posts shown in the final operating position, wherein the tape is contacted to the recording or reproducing drum.

The cassette carriage is preferably mounted on base plate 30 which, together with face plate 14 defines a drawer which supports the cassette load/unload apparatus now described, and which is slidably engageable with the housing 104 which supports the cassette recording and/or reproducing apparatus. FIG. 1 illustrates a preferred embodiment wherein base plate 30 has spaced rollers 31 mounted at its longitudinal edges, and rollers 31 are slidably engageable in roller guides 32 provided in housing sidewalls 12. In addition, upper rollers 33 are mounted on an engagement assembly forming part of the cassette carriage, and upper rollers 33 are slidably engageable in upper roller guides 34 provided in housing sidewalls 12. In this fashion, the base plate, the cassette carriage, and the cassette engaged therein are laterally displaceable with respect to the tape recording and/or reproducing apparatus and housing. Lateral displacement of the tape cassette mounted in the cassette carriage provides adjustment between an initial position wherein the cassette carriage is spaced a distance from the recording and/or reproducing apparatus, as shown in FIG. 1, and an operating position wherein the cassette carriage is in proximity to the recording and/or reproducing apparatus, as shown in FIGS. 7 and 8.

FIG. 1 also illustrates engagement of the cassette tray sized and positioned for insertion of a tape cassette with lower tray mounting members 35. In the cassette insertion position of cassette carriage 20, base member 21 of the upper cassette tray is aligned generally with or slightly above the upper surface of front housing end wall 14. This design facilitates insertion of a tape cassette into the upper cassette tray in the direction of arrow "A". A tape cassette 15 is inserted in the upper cassette tray until one peripheral edge contacts stop means 28 and spaced apertures 23 are aligned with the supply and take-up reels 16, 17 within the cassette and the slidable cover on the bottom of the cassette has been displaced to expose the supply and take-up reels. In this insertion position, the supply and take-up reels are located directly above tape supply and take-up reel shafts 26 and 27, respectively.

Adjusting the tape cassette to a mounted condition is accomplished by lowering the upper cassette tray until the tape cassette supply and take-up reels are securely mounted on the respective tape supply and take-up reel shafts. The upper cassette tray is preferably lowered in a vertical direction with substantially no movement in the horizontal plane. A tray adjustment mechanism is provided mounted between each upstanding sidewall 22 of the upper cassette tray and the corresponding lower tray mounting member 35 for this purpose. The tray adjustment mechanism comprises first crosspiece 36 mounted on upstanding sidewall 22 for rotation about pivot point 37 and second crosspiece 38 mounted on lower tray mounting member 35 for rotation about pivot point 39. Pivot points 37 and 39 are preferably substantially vertically aligned with one another, and first and second crosspieces 36 and 38 are preferably pivotably coupled to one another for rotation by means at pivot 40 mounted at substantially the midpoints of first and second crosspieces 36 and 38. Sliding members 41 and 42 are mounted at or near the ends of crosspieces 36 and 38, respectively, opposite pivot points 37 and 39, respectively. Sliding member 41 is laterally slidable in slot 44 in lower tray mounting member 35, while sliding member 42 is laterally slidable in slot 45 in upstanding sidewall 22 of the upper cassette tray. Thus, as the upper cassette tray is lowered into a cassette mounted position, first and second crosspieces 36, 38 are pivoted to a nearly horizontal position substantially aligned with one another (as shown in FIG. 3), and upstanding sidewalls 22 of the upper cassette tray are aligned adjacent and inside lower tray mounting members 35.

Engagement member 48, which is preferably integral with member 38 also pivots about point 39, extends behind mounting member 35 and has upper roller 33 mounted at its terminal end opposite pivot point 39. Upper roller 33 is sized for sliding engagement in upper roller guide 34 provided in housing sidewalls 12. Engagement member 48 is spring loaded 53, at pivot 39 to maintain it in an extended condition generally parallel to second crosspiece 38 when the cassette carriage is in the cassette insertion condition. In this position, roller 33 is not engaged in upper roller guide 34, but abuts the front surface 49 of housing sidewall 12, and prevents lateral displacement of cassette carriage 20 with respect to the housing and recording and/or reproducing apparatus 50. As the upper cassette tray is lowered from the insertion position (FIGS. 1, 2) to the cassette mounted position (FIG. 3), engagement member 48 is pivoted against the spring loading and, when the upper cassette tray has been lowered into the fully mounted position, upper roller 33 is positioned for sliding in upper roller guide 34. Upper roller guide 34 is preferably provided with an enlarged roller entrance ramp portion 51 (FIG. 2) at the front edge of housing sidewalls 12 to facilitate sliding engagement of upper roller 33 in the upper roller guide.

Additionally, as the upper cassette carriage or tray 20 is lowered from the upper cassette insertion position to the lower cassette mounted position by manual pressure on the top of the cassette, the pivotal access lid 19 located at the inner peripheral edge of the cassette is pivoted into an open, tape access position by contact with projection 49 mounted on the lower cassette tray or base plate 30. Projection 49 maintains the pivotal cassette access lid open as long as the upper cassette tray is in the lowered, cassette mounted position, and permits the pivotal cassette access lid to close when the upper cassette tray and cassette is raised to the upper cassette insertion and withdrawal position.

Figure 2:
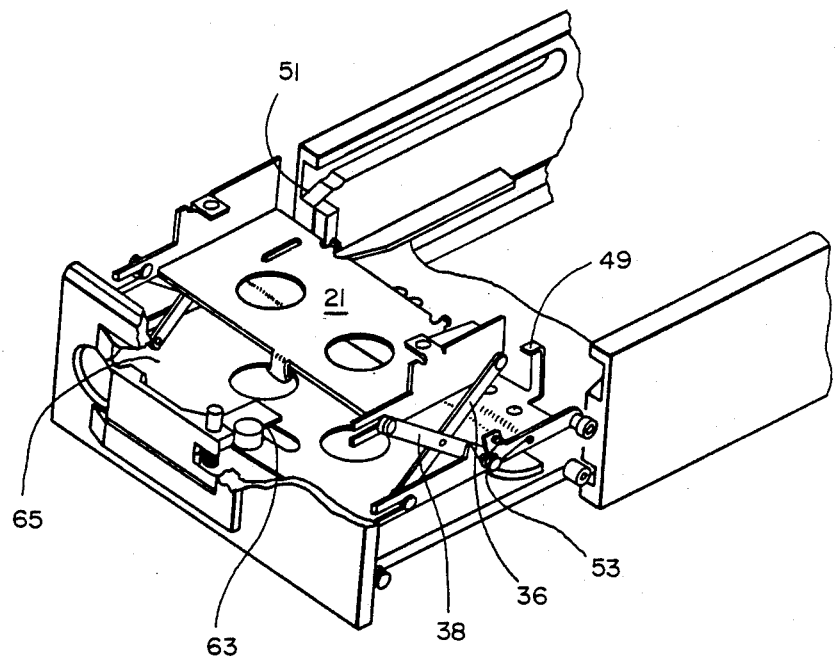
FIG. 2 shows an upper frontal perspective view of the cassette carriage of the present invention in a tape cassette insertion position, with a portion of the front housing end wall broken away to illustrate the cassette carriage latching assembly in a tape cassette insertion position.
Figure 3:
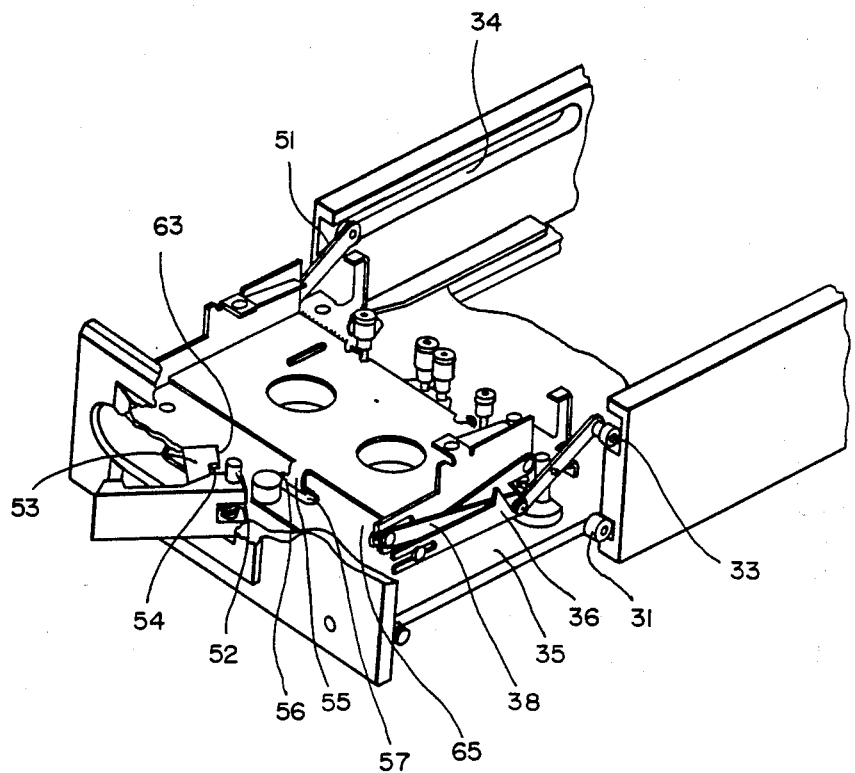
FIG. 3 shows an upper frontal perspective view of the cassette carriage of the present invention in a tape mounting position, with a portion of the front housing end wall broken away to illustrate the cassette carriage latching assembly in a cassette mounted, latching condition
Figure 4:
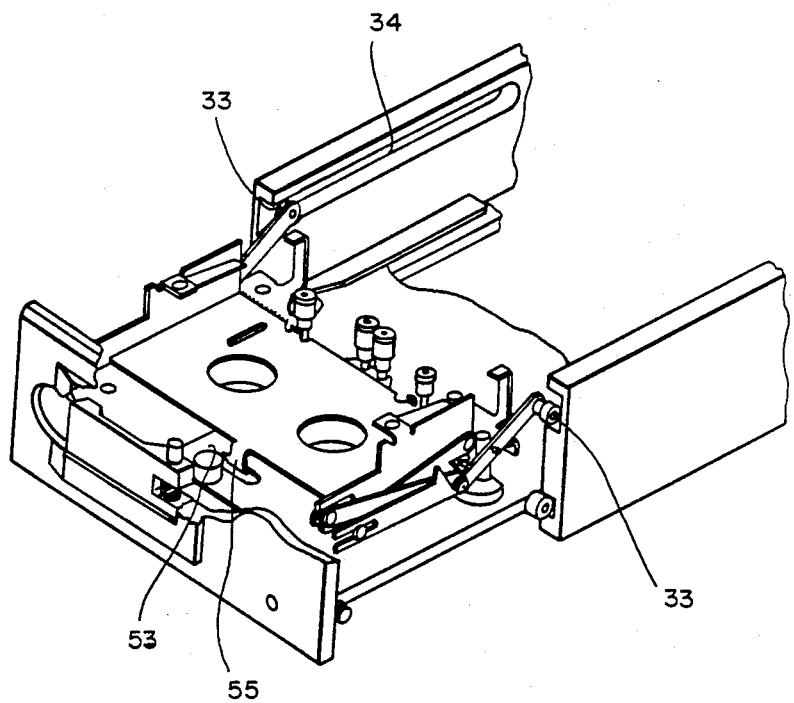
FIG. 4 shows an upper frontal perspective view of the cassette carriage of the present invention in a tape mounted position, with a portion of the front housing end wall broken away to illustrate the cassette carriage latching assembly in a latched condition.

FIGS. 2 through 4 illustrate adjustment of the cassette carriage 20 from an upper, cassette insertion and withdrawal position to a lower, cassette mounted position. A portion of front housing end wall 14 has been cut away to illustrate operation of the mechanical latching means for positively latching cassette carriage 20 and the tape cassette in the cassette mounted position. The mechanical latching means comprises latch handle 61 mounted in front housing end wall 14 for rotation about post 52. Latch detent 53 is rigidly mounted on latch handle 51 extending into the cassette carriage portion of the assembly. Latch detent 53 is preferably mounted at substantially right angles to latch handle 51, and is preferably provided with a generally rectangular recess 54. Latch projection 55 extends downwardly from the outer peripheral edge of base member 21 of the upper cassette tray, and projecting tab 56 forms a pawl extending therefrom for engagement first with the edge 63 of detent 53 to open the latch as the tray passes down, and thereafter the tab engaging recess 54 of latch detent 53. The lower cassette tray 65 is also provided with cavity 57 for passage of latch projection 55 as the upper cassette tray is lowered into the cassette mounted position.

As shown in FIGS. 2 through 4, when latch handle 51 is pivoted to an open position as shown in FIG. 3, the upper cassette tray 20 may be lowered from the upper cassette insertion and withdrawal position illustrated in FIG. 2 to the lower cassette mounted position shown in FIGS. 3 and 4. Projecting tab 56 of latch projection 55 is received in cavity 57 in the lower cassette tray when latch detent 53 is in the open position along with latch handle 51. FIGS. 2 through 4 also illustrate the movement of the roller 33 up the head surface 49 of sidewalls 11, 12 and into guide slots 34.

The cassette having been lowered into position to move with the main plate into the housing, the access portion of the tape can now be withdrawn and the cassette and tape moved into the housing to place the access portion of the tape against the transducer 50. This operation will be described with respect to FIGS. 5 through 9.

Figure 5:
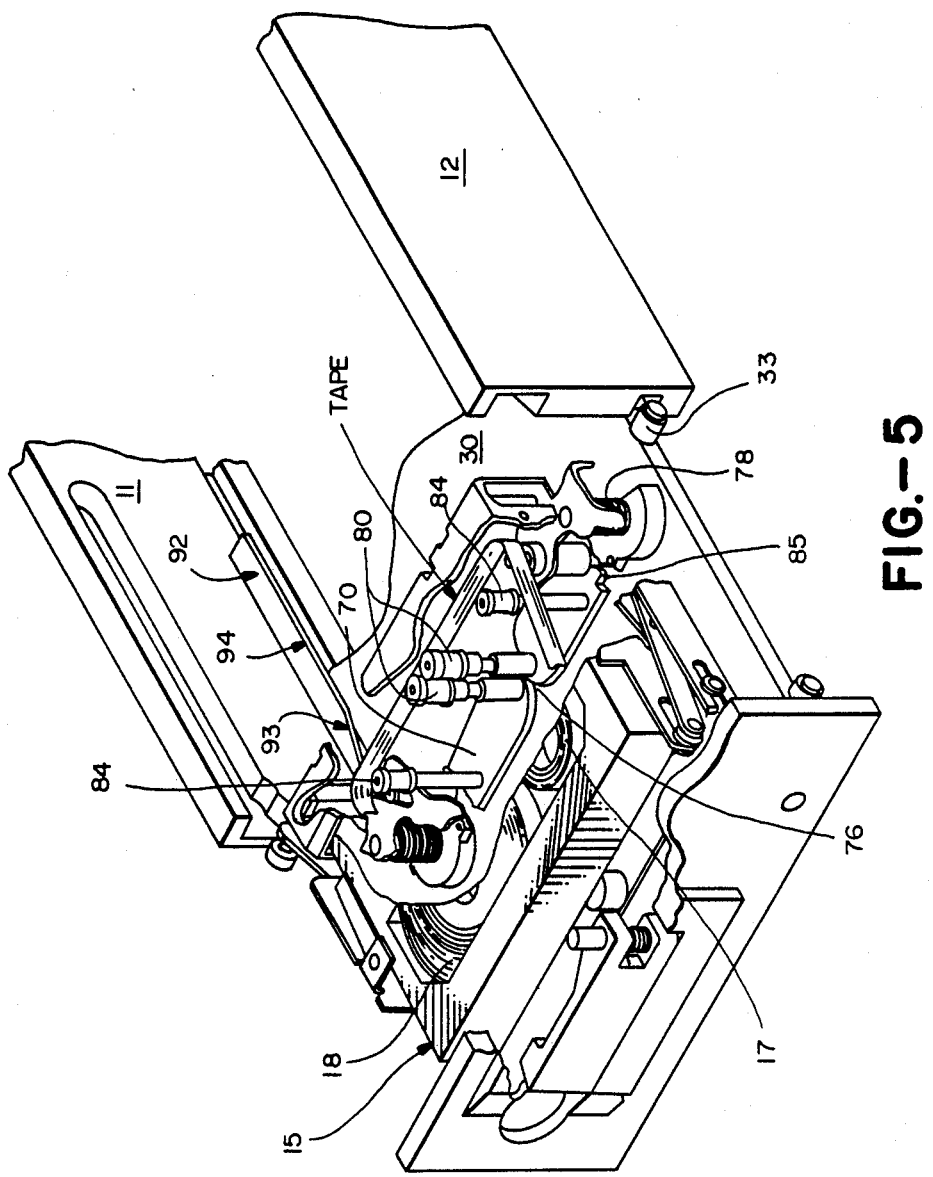
FIG. 5 shows an upper frontal perspective view of a tape cassette mounted in the cassette carriage, with the tape withdrawal and positioning means in an initial position within the cassette and behind the access portion of the tape.
Figure 6:
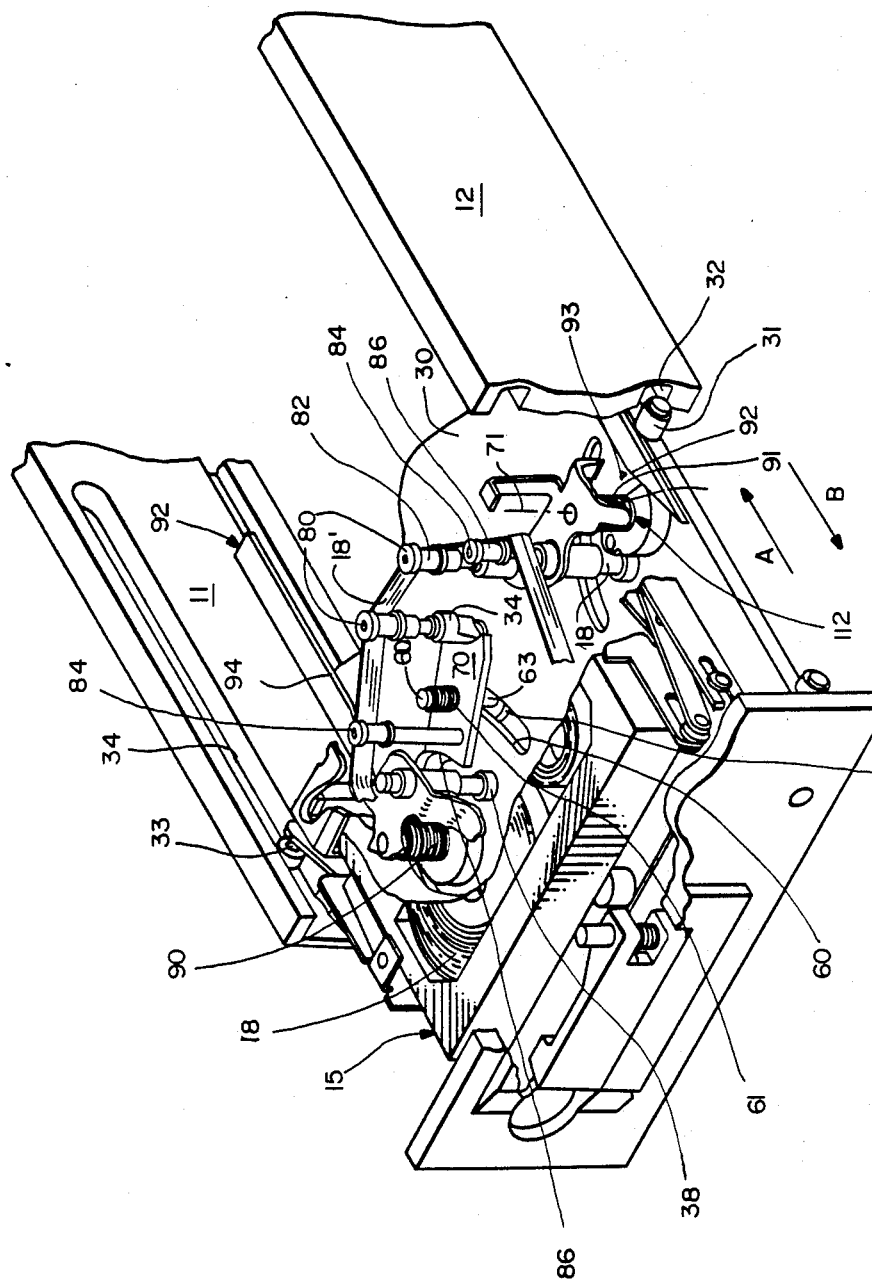
FIG. 6 shows an upper frontal perspective view of a tape cassette mounted in a cassette carriage slidably engaged in a tape recording and/or reproducing apparatus housing, with the tape and the tape guidance posts shown in an intermediate position between the initial position within the cassette and the final operating position in proximity to or in contact with the recording or reproducing drum.

FIGS. 5 and 6 also illustrate the location of pivotable tape guide arms 70 in the initial position of the base plate assembly and tape cassette 15. Tape guide arms 70 are mounted for rotation about pivot axes 71 (FIG. 6) on a portion of the cassette main plate 45, or on base plate 30. Two tape guide arms 70 are preferably provided aligned with one another in a mirror image arrangement, with their respective pivot axes 71 in proximity to opposite longitudinal edges of base plate 30, and their respective terminal edges 76 opposite pivot axes 71 adjacent one another.

Pivotable tape guide arms 70 are preferably spring-loaded by means of springs 78 so that they remain in the position shown in FIG. 5 until an external force is exerted upon them. Each pivotable tape guide arm 70 is preferably provided with two tape guidance posts extending in a generally upright orientation therefrom. Lead tape guidance post 80 is mounted in proximity to terminal edge 76 of tape guide arm 70 and projects substantially perpendicularly from tape guide arm 70. Tape roller guide 82 is preferably mounted at the upper end of lead tape guidance post 80. Follower tape guidance post 84 is preferably mounted in proximity to inner edge 85 of tape guide arm 70 intermediate terminal edge 76 and pivot axis 71. Follower tape guidance post 84 projects substantially perpendicularly from tape guide arm 70 and is provided with tape roller guide 37 at its upper end. Pivotable tape guide arms 70 may also be provided with slots to accommodate the datum pins mounted on the cassette main plate 45 or the base plate 30.

As shown in FIG. 5, in the initial position, cassette 15 is securely mounted in the cassette carriage and the take-up and supply reels are engaged with drive shafts forming part of the drive assembly. Pivotable tape guide arms 70 are located generally underneath the inner peripheral edge of cassette 15 in the area of access portion 18' of the tape 18. Lead and follower tape guidance posts 80 and 84, respectively, are disposed behind the inner peripheral edge of the cassette and access portion 18' of the tape, and tape roller guides 82 and 86 are positioned in proximity to tape access portion 18'. The height of lead and follower tape guidance posts 80 and 84 and the position of tape roller guides 82 and 86 are adjusted to provide that tape access portion 18' is centered with respect to tape roller guides 82 and 86. In the initial position, tape roller guides 82 mounted on lead tape guidance posts 80 are preferably adjacent to but spaced from tape access portion 18', while tape roller guides 86 mounted on follower tape guidance posts 84 are preferably displaced a greater distance behind tape access portion 18', as shown in FIG. 1.

As shown in FIG. 6, the base plate assembly is laterally displaceable by sliding engagement of upper and lower rollers 33 and 31, respectively, in roller guides 34 and 32, respectively, provided in housing sidewalls 11, 12. Tape guide arms 70 are rotated about their pivoted axes 71 by interaction of tape guide arm contact surfaces. 90 with contoured surfaces, such as tape guide arm cam members 90 provided on the interior surfaces of housing sidewalls 12. While tape guide arm cam members 92 are illustrated as contoured members projecting from housing sidewalls 12, and this is a preferred embodiment, the use of contoured grooves in housing sidewalls 12 for pivoting tape guide arm 70 would also be suitable. Each tape guide arm cam member 92 preferably includes an angled portion which angles from a location at or near the upright edge of sidewall 12 toward the recording and/or reproducing drum, to provide gradual rotation of arms 70 and withdrawal of tape 18 from the cassette 15. Each tape guide arm cam member 92 additionally includes a substantially level section 94 contiguous with the angled portion.

As especially shown in FIG. 6, lateral displacement of the base plate assembly in the direction indicated by arrow "A" initiates interaction between contact surfaces 91 of pivotable tape guide arms 70 and inclined portions 93 of tape guide arm cam members 92, which rotates the tape guide arms about their pivot axes 71. Lateral displacement of the base plate assembly may be achieved by manually sliding the cassette carriage in the housing, by motorized drive means or preferably by the force of constant tension springs 100 (FIG. 1) corrected between the base plate and pins 102 in sidewalls 11, 12.

Rotation of tape guide arms 70 about pivot axes 71 causes tape guide rollers 82 and 86 mounted on lead and follower tape guidance posts 80 and 84, respectively, to contact tape access portion 18' and withdraw tape from tape cassette 15. FIG. 6 illustrates the location of tape guide arms 70 and tape access portion 18' at an intermediate position between the initial position and the final operating position wherein tape access portion 18' contacts the recording and/or reproducing transducer 50.

FIG. 7 illustrates the tape withdrawal and positioning system of the present invention in the final, operating position wherein tape access portion 18' is brought into contact with or close proximity to recording and/or reproducing drum 50. In the final, operating position, tape guide arms 70 are extended, and they are maintained in the extended position by interaction of contact surfaces 90 of the tape guide arms 70 with level section 94 of tape guide arm cam member 92. In this position, the tape 18 is fully withdrawn from tape cassette 15, and is guided around lead and follower tape guide rollers 82 and 86. Lead tape guide rollers 82 are positioned behind, or inwardly from frontal circumferential surface 51 of recording and/or reproducing drum 50. As a result of this arrangement, the tape extending between lead tape guide rollers 82 is brought into contact with or close proximity to the frontal circumferential surface 51 of the recording and/or reproducing drum 50 in the final, operating position. Activation of an interlock switch or the like may then initiate the recording or reproduction function.

FIGS. 6 and 7 illustrate a preferred embodiment of the tape withdrawal and positioning system of the present invention wherein pivotable tape guide arms 70 are provided with a stabilization mechanism to prevent movement of the tape guide arms in a vertical direction. As shown in FIG. 6, upper post 60 is mounted projecting from the upper surface of pivotable tape guide arm 70. Compression spring 61 is mounted on upper post 60 between the upper surface of tape guide arm 70 and crossbar 62. Lower post 63 is mounted projecting from the lower surface of pivotable tape guide arm 70 and is attached at its terminal end to enlarged retaining member 64. Arcuate slot 65 is provided in base plate 30 to permit pivoting of the tape guide arm between the initial position and the final, operating position. The force of compression spring 61 and the placement of enlarged returning member 64 serves to prevent movement of the pivotable guide arms 70 in a vertical direction during adjustment between the initial and final, operating positions.

As shown in FIG. 7, tape recording and/or reproducing drum 50 is mounted on drum support plate 110. Tape recording and/or reproducing drum 50 preferably comprises a helical recording and/or reproducing drum of a type which is known in the art for recording on digital audio tape. Drum support plate 52 is mounted between housing sidewalls 11, 12, and is provided with cutouts 53 (FIG. 1) to permit positioning of pivotable tape guide arms 70 and the corresponding tape guidance posts 80 in the final operating condition. "V" blocks 55 having grooves 56 (FIG. 1) for locating and engaging lead tape guidance posts 80 are mounted on drum support plate 52 to provide consistent, precise alignment of the lead tape guidance posts 80 and pivotable tape guide arms 70 in the final operating position. Grooves 56 may be generally V-shaped, semicircular, rectangular, or the like. As shown in FIG. 7, lead tape guidance posts 80 are preferably provided with annular groove 112 sized and located for engagement with groove 56 of "V" block 55.

FIG. 8 shows the tape withdrawal and positioning system of the present invention in the final, operating position, and illustrates the relationship of the tape withdrawal and positioning system and base plate assembly with respect to the recording and/or reproducing drum 50 and the housing members. In the final, operating position of the tape recording and/or reproducing apparatus, lead tape guidance posts 80 are engaged with "V" blocks 55. A constant tension spring arrangement 100 is provided to maintain the base plate assembly in its laterally displaced condition and to maintain lead tape guidance posts 80 securely engaged in "V" blocks 55. The constant tension spring arrangement preferably includes constant tension coiled springs 100 mounted on base plate 20 on either side of the plate, as shown in FIG. 5. One end of each constant tension spring is mounted on pin 102 projecting from sidewalls 11, 12 near the rear housing wall. Constant tension coiled springs 100 are preferably provided in proximity to both longitudinal edges of base plate 30 to provide constant tension on the base plate assembly in the direction of arrow "B" as shown in FIG. 6.

When the tape is fully withdrawn from the cassette 15 against the transducer 50, to hold the base plate 15 in place, and prevent inadvertent withdrawal of the cassette, a solenoid 120 is provided. It operates on the simple principle that the latch is closed holding the plate from withdrawal as shown in FIG. 9B during any data operation. It is only on a positive command from the controlling microprocessor that the latch can be opened as shown in FIG. 9A, and the plate can be carried with the drawer out of the housing.

When the tape recording and/or reproducing function has been completed, the tape 18 is returned to its initial position within tape cassette 15 by reversing the process described above. In other words, tape cassette 15, the cassette carriage, and base plate assembly are laterally displaced with respect to recording and/or reproducing apparatus housing in the direction of arrow B. During this lateral displacement, tape guide arms 70 are pivoted from their extended positions shown in FIG. 7 to an intermediate position shown in FIG. 5 by torsion spring 112, and finally to their initial positions underneath the inner peripheral edge of tape cassette 15, as shown in FIG. 5. During this action, the supply reel motor is activated and the tape is conveyed from its final operating position in contact with or close proximity to recording and/or reproducing drum 50 to the initial position wherein tape access portion 18' is within tape cassette 15 and generally aligned with the inner peripheral edge of the cassette. Tape cassette 15 may then be ejected from the cassette drive assembly and then removed from cassette carriage.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A tape withdrawal and positioning system for withdrawing tape from a cassette and positioning it in proximity to a tape recording and/or reproducing transducer comprising:
   a cassette carriage slidably engageable in a tape recording and/or reproducing assembly housing for manual lateral displacement toward and away from the tape recording and/or reproducing transducer;
   a base plate assembly adapted for engaging a tape cassette having a tape access portion aligned generally at an inner peripheral edge of said tape cassette;
   two tape guide arms pivotably mounted on said base plate assembly, each said tape guide arm having at least one tape guidance post mounted thereon and projecting generally upwardly therefrom;
   two contoured tape guide arm cam members provided on said housing for interaction with said tape guide arms to pivot said tape guide arms during and as a result of said manual lateral displacement from an initial position wherein said tape guide arms are located generally below said cassette at a position corresponding generally to said tape access portion and a final, operating position wherein said tape guide arms are generally extended and positioned in proximity to said tape recording and/or reproducing transducer.

2. A tape withdrawal and positioning system as claimed in claim 1 wherein said housing comprises at least a bottom main plate included in said base plate assembly extending between two upright sidewalls to define a region including said initial position and said operating position for base plate assembly, said cassette carriage and said base plate assembly being supported to slide between said sidewalls from said initial position to said operating position.

3. A tape withdrawal and positioning system as claimed in claim 2 wherein said cassette carriage and said base plate assembly are supported on said bottom main plate, said main plate being slidable between said walls to move said carriage and base plate assembly from said initial position to said operating position.

4. A tape withdrawal and positioning system as in claim 2 wherein said housing includes an upright rear wall for defining said region, and means connecting said main plate to said rear wall to aid in drawing said main plate into said operating position.

5. A tape withdrawal and positioning system as in claim 2 wherein said tape guide arms are aligned with one another in mirror image arrangement with pivot axes in proximity to opposite longitudinal edges of said main plate and adjacent the upright sidewalls as the guide arms move to said operating position.

6. A tape withdrawal and positioning system as in claim 5 wherein said tape guide arms are spring-loaded to maintain said arms in alignment when in said initial position until engaged by said cam members.

7. A tape withdrawal and positioning system as in claim 6 wherein one said tape guidance post on each said arm is a lead tape guidance post mounted proximal the terminal end of said arm, rotation of said arms causing said lead posts to contact the tape in said tape cassette and withdraw said tape to be positioned adjacent said transducer in said operating position.

8. A tape withdrawal and positioning system as in claim 7 wherein each said arm carries another said tape guidance post comprising a follower tape guidance post supported substantially perpendicular to said arm and mounted intermediate said lead guidance post and said pivot axis to support and guide said tape past said transducer.

9. A tape withdrawal and positioning system as in claim 8 wherein each said tape guidance posts includes a tape roller at its upper end.

10. A tape withdrawal and positioning system as in claim 5 wherein said cassette includes a supply reel and a take-up reel, said tape access portion extending from said supply to said take-up reel near a lead edge of said cartridge nearest said transducer, said pivotable tape guide arms being located generally underneath said lead edge of said cartridge, said lead tape guidance posts being positioned adjacent said tape access portion, movement of said guide arms by said cams withdrawing said access portion of said tape from said cartridge.

11. A tape withdrawal and positioning system as in claim 10 wherein said follower tape guidance posts are distanced from said tape access portion along said tape and located nearer said supply and take-up reels.

12. A tape withdrawal and positioning system as in claim 11 wherein each said tape guide arm includes a surface adapted to contact the cam surface on said vertical sidewall and rotate said guide arm and thereby said tape guidance posts, withdrawing said tape access portion from said cassette.

13. A tape withdrawal and positioning system as in claim 11 wherein said tape guide arms include means for rotating said arms and therewith said tape guide posts as said cassette support moves adjacent said transducer, said lead tape guidance posts being positioned behind or inwardly from a frontal circumferential surface of said transducer when said cassette is in said final, operating position to hold said tape against said transducer.

14. A tape withdrawal and positioning system as in claim 13 wherein each tape guide arm includes a stabilization mechanism for preventing vertical movement of said tape guide arms comprising a post sliding in an accurate slot in said bottom main plate as said guide arm moves from said initial position to said final position, said post having an enlarged head at one end thereof and compression spring surround said post to bias said post, and thereby said tape guide arm against vertical movement or tilt.

15. A tape withdrawal and positioning system as in claim 14 wherein said transducer is mounted on a support plate extending between said vertical sidewalls and including slots aligned to allow movement of said lead tape guidance posts past said transducer to hold said cassette tape against said transducer.

16. A tape withdrawal and positioning system as in claim 15 including a solenoid-operated latch for holding said bottom main plate, and thereby said tape guide arms in said operating position to prevent inadvertent withdrawal of said tape from said transducer.

* * * * *